though the relationship between it and flow rate of carrier fluid is not fully understood, and while it is found to vary with equipment as well as with materials supplied, it is determined prior to actual grinding operations. The actual relationship between the flow rate of carrier fluid and the flow rate of slurry to be ground is maintained by control of the feed rate.

United States Patent [19]
Rouse et al.

[11] Patent Number: 5,238,194
[45] Date of Patent: Aug. 24, 1993

[54] METHOD OF PRODUCING FINE ELASTOMERIC PARTICLES

[76] Inventors: Michael W. Rouse, P.O. Box 820369, Vicksburg, Miss. 39182-0369; Morgan L. White, 5 McCall Cove, Vicksburg, Miss. 39180

[21] Appl. No.: 831,216

[22] Filed: Feb. 10, 1992

[51] Int. Cl.$^5$ .............................................. B02C 23/02
[52] U.S. Cl. ...................................... 241/21; 241/30; 241/DIG. 31
[58] Field of Search ............. 241/17, 21, 23, DIG. 31, 241/30

[56] References Cited
U.S. PATENT DOCUMENTS 2,211,518  8/1940  Scherbaum ........................... 241/66
4,535,941  8/1985  Brubaker et al. ...... 241/DIG. 31 X
4,621,773  11/1986  Calevich et al. ...................... 241/21
4,625,922  12/1986  Brubaker et al. ...... 241/DIG. 31 X Primary Examiner—Mark Rosenbaum
Assistant Examiner—Frances Chin
Attorney, Agent, or Firm—Alexander Norcross

[57] ABSTRACT

A method for grinding fine elastomeric particles between opposed rotating grinding wheels in which a flow rate of carrier liquid is first established through the stones when closed to a desired grinding pressure, establishing a maximum flow rate of carrier liquid. A slurry to be ground is then fed into the grinding wheels at a flow rate equal to that established for the carrier liquid alone. It is found that the gap between the two grinding wheels will remain substantially constant, and the throughput rate of ground material will be optimized.

9 Claims, No Drawings

METHOD OF PRODUCING FINE ELASTOMERIC PARTICLES

BACKGROUND OF THE INVENTION

This patent pertains to the reduction of elastomeric particles to a very small size by abrading or grinding the particles between rotating milling wheels.

It has been found particularly advantageous in recycling and reusing elastomeric products to reduce the size of this material to very small size particles; such particles have been discovered to be chemically more reactive and mechanically easier to dissolve into various mixes or recycled uses. Such very small particles are here defined as being particles that will pass through a minus 50 mesh or finer. Since the particles are of very irregular outline, this is the preferred method of stating sizes; they have no defined orientation, and thus no external dimensions can be specified. A wide range of rubber or synthetic rubber products may be so treated and reclaimed. Such materials include natural or synthetic rubber scrap, automotive tire scrap, and various polymers and plastics. The most common such materials are natural or synthetic rubbers.

Various methods have been suggested in the prior art for reducing fine sized elastomeric particles as part of a reclaiming or recycling process including cryogenic cracking of the particles and various grinding or chopping methods.

However, the best method now known for producing, in the greatest quantity and at less cost, fine elastomeric particles has been by milling the rubber between horizontal grinding stones in a horizontal grinding mill. This technique has been well developed in the flour, paper pulp industry and the paint pigment compounding industry.

Such methods for horizontal mill grinding of rubber are shown in, for example, U.S. Pat. No. 4,535,941 to Brubaker, et al which shows a method of horizontal grinding rubber pellets. A mixed rubber fluid slurry is formed of coarse rubber pellets in a carrier liquid, typically water. This slurry is pumped under pressure into a zone between two milling wheels, and the rubber particles sizes are reduced in the region between the faces of these milling wheels. The milling wheels are in the form of two disc shaped grinding stones, facing and opposed to each other; one stone is fixed and the other stone rotates with respect to the fixed stone. The two milling wheels are pressed upon the pellets and slurry with considerable force in an effort to reduce the pellets to a fine state in a single pass.

U.S. Pat. No. 4,625,922 to Brubaker shows another method for grinding rubber pellets, utilizing elevated temperatures and pressures in an attempt to produce a fine rubber grind.

It has been found in practice that the above processes do not produce a uniformly fine grind and in fact, seldom produce particles in the claimed 50 micron range.

Further, adjustment of the grinding mills, which are the same mills widely used in the paint pigment compounding industry, is extremely critical under the methods previously disclosed. For instance, the first Brubaker patent requires pressure of over 2000 pounds be imposed between the milling wheels; the slightest interruption of slurry flow under these conditions would result in the instant contact of the milling wheels and their seizure and destruction. The friction and energy introduced to the slurry by this milling process raises the slurry to relatively high temperatures, and much of the carrier liquid is lost as steam, especially if the pressure on the slurry is released. If this steam flash over occurs between the grinding stones the slurry becomes a largely dry rubber mass, also inhibiting grinding.

The attempt to simultaneously control motor current and stone pressure as variables results in wide swings in through-put and an extreme variability in the quality of the resulting ground product. It has proven in practice quite difficult to obtain sustained high uniform quality production rates using the processes heretofore described.

SUMMARY OF THE INVENTION

We have discovered a method for grinding elastomeric particles between horizontal rotating milling wheels which produces a high, uniform production rate of suitably fine elastomeric particles, in a single pass, and which avoids many of the control variables and resulting adjustment problems implicit in the prior art as understood to date.

In our method we use a horizontal grinding machine of the type comprising a fixed stator and a rotating rotor, on which are mounted disc shaped grinding stones having hollow centers. These grinding stones have flat, opposing abrasive surfaces in the form of a flat annulus surface, each opposed to the other. This grinding surface has periodically spaced openings in the annulus for introducing material to be ground between the closed, cooperating abrading surfaces.

The method claimed below will also function on grinding machines which have counter rotating rotor stones, as are commonly used in the pulp and paper grinding industry.

Means are provided for introducing a liquid or a slurry into an open region in the center of the opposed grinding stones and for removing a liquid or a slurry from a capture region outside the outer perimeter of the opposed grinding stones.

Means are also provided for bringing the grinding stones into contact with or spacing them a distance apart, one from the other; such means include a method for maintaining any chosen fixed position of the grinding stones with respect to each other. Such means are well known in the art of colloid mills. Persons of skill in the art will readily understand how a material is input, at a feed pressure, to such a mill to be ground and how the spacing between stone sis to be adjusted and set.

The inventive method is based on establishing a uniform set point fluid flow rate through a properly spaced set of stones.

This is accomplished by first establishing an excessive flow of water through an open set of non-rotating stones. The stones are spaced a small distance apart, without rotation and then water is pumped into and through the gap between the stones' grinding faces until there occurs a back flow or back pressure, indicating that water is flowing at a maximum rate through the stones.

Rotation of the stones is then started; the stones are brought to full speed. The stator is then closed against the rotor until a desired pressure of closure is achieved. This pressure between the two stones is chosen so as to achieve a desired grinding result. High pressures may be utilized to enhance pump action through the stones; working pressure between the stones, which is related to feed pressure on the slurry to be ground can range down to relatively low pressures on the fluid passing between the stones, as low as five pounds per square inch. The entire pressure between the grinding stones will be proportional to the face area of the milling stones and the pressure of the feed stock slurry at the grinding machine inlet. The pressure of the feed stock water or fluid applied to the grinding mill should not then drop below the resulting set pressure (per square inch) between the two stone faces and should not rise above approximately twice such pressure.

At the chosen pressure, a maximum flow rate of the water through the grinding gap between the stones will be determined. Over the range of water feed pressures mentioned, the flow rate will be substantially constant. Once this water feed pressure and stone pressure are set, the water flow rate, defined as the weight of liquid passing through the stones in weight units per minute, is established. This defines an established set point flow rate.

The grinding mill is then fed with a slurry of a carrier liquid and the material to be ground and the fluid used to establish the flow rate is shut off. The slurry flow rate, again defined by the weight of slurry per u it time flowing into the grinding mill, should be slightly greater than the set point flow rate and the slurry should be pumped to the inlet of the grinding stones at the desired slight excess pressure over the pressure between the stones. The energy expended in rotation of the stones is largely dissipated into the grinding slurry as heat. This milling heat increases the temperature of the slurry during milling over the temperature of the slurry at the inlet to the grinding machine. For a given setting of stone speed, size and flow rate, the energy added to the slurry during milling will be substantially constant. Therefore, the temperature of the slurry during the milling process can be controlled by controlling the inlet feed stock temperature; the combination of constant energy input across the milling stones and constant flow rate resulting from the inventive process insures a predictable temperature rise across the opposing faces of the milling stones from milling. This permits the control of temperature of slurry during milling to achieve desired viscoelastic effects in milling by controlling the inlet feed slurry temperature.

Under these circumstances, it will be found that the position of the rotor and stator stones will remain constant and that the milling rate of the material to be ground will be equal to the established flow rate.

It has further been determined that this method produces a higher quantity of a more uniformly fine ground particle than the prior art and that wear on the stones is minimized by the process.

It is therefore an object of the invention to disclose a method of grinding elastomeric particles in a slurry between opposed horizontal milling stones which provides a uniform optimum production rate of fine ground particles.

It is a further object of the invention to disclose a method for grinding elastomeric particles which produces continuing high quality of very finely ground elastomeric particles.

It is a further object of the invention to disclose a method of grinding elastomeric particles between opposed facing milling wheels which minimizes wear and damage to the grinding wheel while maximizing production of fine elastomeric particles in a single pass.

It is a further object of the invention to disclose a method of grinding elastomeric particles between opposed milling wheels which minimizes the control variables and adjustments which must be made and monitored during the grinding process thus maximizing uniformity of the grind and being able to predict the quantity of material being produced by utilizing laws of physics and mathematics.

It is a further object of this invention to disclose a method of grinding fine elastomeric particles which permits grinding of a dry stream of elastomeric particles, using a gas or air as a carrier medium for the grinding slurry.

These and other objects of the invention may be more clearly determined from the detailed description of the preferred embodiment which follows.

DETAILED DESCRIPTION OF THE PREFERRED EMBODIMENT

The inventive method of producing a finely ground particle at best efficiency is based on establishing a set point, uniform fluid flow rate and a related inlet feed pressure through adjustment of the position of an opposed set of milling stones. The first step is to establish, for a given set of milling stones in a specific grinding mill, a set point flow rate in terms of the weight or mass of liquid passing between the stones in a given time. This flow rate then becomes the basis for flowing grinding material or slurry, consisting of the material to be ground and a carrier liquid, through these adjusted stones. As shown below, this procedure, when followed, produces a significant increase in the percentage of particles reduced to a very fine state during a single pass through the grinding machine.

This description is based on an experimental embodiment using a horizontal grinding machine of the type comprising a fixed stator and a rotating rotor, on which are mounted disc shaped grinding stones having hollow centers. These grinding stones have flat, opposing abrasive surfaces in the form of a flat annulus surface, each opposed to the other. This grinding surface has periodically spaced openings in the annulus for introducing material to be ground between the closed, cooperating abrading surfaces. In the embodiment here described, each stone has a grinding surface of approximately 30 square inches.

The method is not restricted to this particular embodiment. It will function on grinding machines having counter-rotating rotors, as are more commonly found in the pulp and paper grinding industry.

Means are provided for introducing a liquid or a slurry into an open region in the center of the opposed grinding stones and for removing a liquid or a slurry from a capture region outside the outer perimeter of the opposed grinding stones.

Means are also provided for bringing the grinding stones into contact with or spacing them a distance apart, one from the other; such means include a method for maintaining any chosen fixed position of the grinding stones with respect to each other. Such means are will known in the art of colloid mills. Persons of skill in the art will readily understand how a material is input, at a feed pressure, to such a mill to be ground and how the spacing between stones is to be adjusted and set.

The inventive method is based on establishing a uniform set point fluid flow rate through a properly spaced set of stones is to be adjusted and set.

This flow value is established by pumping excessive water through an open set of stones, without rotating the rotor against the stator, then bringing the rotor to normal rotational operating speed. The rotor is closed against the stator until 300 pounds pressure (approximately 10–12 psi) is on the stones. For low pressure grinding, the fluid pressure to the stones should be approximately 5 psi and should never exceed 10 to 12 psi.

Higher pressure grinding can be beneficial, as the increased pressure permits the temperature of the slurry to be raised in grinding above the vaporization point of the carrier fluid at standard atmospheric pressure. The increased temperature can independently have beneficial grinding effects by affecting the viscoelastic properties of the particles being ground. Of equally great benefit, if the temperature of the slurry is raised above the vaporization point of the carrier liquid, then the increased pressure between the stones will maintain the carrier liquid in a liquid state during grinding, the rotating stones pumping the slurry through the grinding mill. As soon as the ground particles in slurry exit from between the grinding stones to a reduced normal atmospheric pressure, the carrier liquid will flash off, leaving substantially dry particles to be separated and captured external to the grinder. This avoids the necessity of having a separate processing step of drying the ground particle, and the energy costs of running a separator.

It is also possible to have the pressure at the outlet of the grinding stones reduced to vacuum like conditions, which will enhance flash off of the grinding carrier liquid or water, producing a desirable dry powder.

Such higher grinding pressures are best set and maintained by using a positive mechanical support to set and hold a fixed distance between the rotor and stator stones in the grinding machine; high grinding pressures will tend to separate grinding stones if held apart by hydraulic spacing means alone.

It appears that flow of the slurry into and through the grinding stones is produced by a centrifugal pumping action induced by the relative rotation of the grinding stones. This centrifugal pump effect is a significant aspect of the grinding process and the uniform throughput rate established by our method. Any changes in the physical gap between the stones, as would be caused by excessive feed pressure, can change the effective orifice of this centrifugal pump, and will adversely affect the flow rate of the slurry. The size of this gap also strongly affects the size to which the majority of rubber particles are reduced by grinding.

The set point flow rate between the rotor and stator stones is established in terms of weight in pounds of slurry per minute. Any excessive slurry being pumped into the grinding mill is allowed to drain off and not forced between the stones.

Once the set point flow rate is established, a slurry mixture of rubber and water is pumped into the area between the stator and rotor stones; the fluid used to establish the set point flow rate (in the above example water) is shut off. During this change of fluids, the flow rate is not allowed to fall below the set point. The slurry mixture flow rate should be equal to or slightly excessive of the established set point flow rate and should be pumped into the grinding mill to establish a feed pressure at the grinding stone inlet of 5–10 psi pressure for low pressure grinding or up to 150 psi for high pressure grinding; maintenance of a feed inlet pressure greater than the pressure between the grinding stones is necessary to prevent back flashing of steam into the inlet to the grinding stones, resulting from the frictional heat generated during the milling process. The milling rate of the slurry is equal to the feed rate when the above conditions are established and controlled.

It will be found that the rotor and stator stones will remain at constant positions with respect to each other, as measured by the pressure applied to these stones, and that the wear will not be excessive as long as the set point flow rate and pressure conditions are maintained and controlled.

The procedure just established can be stated mathematically by the following equation:

$$\text{Flow} = \frac{(K)\left(\begin{array}{c}\text{Surface Area of grinding}\\\text{stone orifices}\end{array}\right)(\text{feed pressure})}{\text{RPM}}$$

Where the surface area of the grinding stone orifice is equal to the percent porosity of the milling stones times the milling stones stated grinding area.

K is a constant value for any given grit, pore size, and percent porosity of a given milling stone. It represents the restriction to flow inherent in that stones design. Each stone design will have a different K value.

Revolution per minute (rpm) is the speed of the rotor stone.

Flow is the volume or weight of slurry that can be obtained during the above described conditions.

It is considered part of applicant's discovery that a grinding mill can be adjusted and run substantially as though the grinding stones formed a centrifugal pump; when the inventive process is utilized, flow through the grinding stones will behave as though the stones formed such a pump, and the flow is controlled and responds using the same adjustment techniques of adjusting pump diameter, rotational speed and inlet head pressure to create a proportional change in pump throughput flow. This requires that the distance between the grinding stones be kept substantially constant once set according to the process of the invention, and mechanical adjustment of grinding stone separation is considered preferable to avoid variation of spacing under load, especially at higher grinding machine feed inlet pressures.

In experiments, adjustment of the horizontal mill according to the method of the invention causes a significant increase in throughput of ground particles of the desired smaller size, and a smaller percentage of particles passed through the mill without adequate reduction in size. This alone is beneficial, as the economic losses occasioned by the necessity of screening out insufficiently reduced particles and re-grinding them are reduced.

In addition the method of the invention maximizes the total usable throughput of ground slurry. In essence, the method establishes an optimum grinding point for a given mill; either an increase or decrease increase in flow will result in a significant decrease in properly ground elastomeric particles.

Further, the significantly reduced pressure between the grinding stones, over the methods of the prior art, and this significantly extends the lifetime of the grinding stones. More over, the lessened pressure decreases the incidence of flash over, grinding stone contact, or catastrophic grinding stone failure, reducing downtime, and increasing production.

In the experimental embodiment described, the carrier fluid was water, and the ground material rubber. The method can readily be extended to any elastomeric material which is fludized by a carrier liquid and then ground. In particular preliminary experiments have indicated that air or gasses may serve as a suitable carrier medium for certain polymers to be ground. The use of pneumatic methods for fluidizing and transport of particulates is known; we believe that under suitable conditions, such methods may be used in our inventive process, using air or gasses as the carrier medium.

The method also applies to any mill in which a slurry is ground between opposing grinding stones, including vertical mills, and mills in which both stones rotate. The invention is therefore not limited to the experimental embodiment described, but extends to the general equivalents as claimed.

I claim:

1. A method for reducing an elastomeric particle to a finely ground state between an opposed set of rotating, grinding stones, comprising:

establishing a maximum set point mass flow rate of a fluid between the grinding stones at a chosen pressure between the grinding stones, thereby establishing a set point inlet feed pressure;

continuously rotating the stones while supplying said fluid input to the grinding stones at or slightly above the set point inlet feed pressure;

changing said inputted fluid to a slurry containing particles to be ground;

controlling the inlet feed pressure of the slurry such that the mass flow rate of the slurry through the rotating grinding stones is equal to said set point mass flow rate.

2. The method of claim 1 wherein the step of establishing a set point mass flow rate comprises:

setting the stones in a non-rotating position a spaced distance apart;

providing a fluid under pressure to the inlet of said stone such that the fluid flows between the stones;

rotating the stones;

clamping the stones together with an increasing pressure until a desired grinding pressure is achieved;

increasing the feed rate of fluid to the inlet of the stones until a maximum flow rate is obtained.

3. The method of claim 2 wherein said desired grinding pressure is approximately five pounds per square inch.

4. The method of claim 2 further comprising:

holding said desired grinding pressure at a value such that said slurry flows between the stones at an elevated temperature in a liquid state, said slurry boiling off after passage through the stones.

5. The method of claim 4, said desired grinding pressure being up to 150 pounds per inch.

6. The method of claim 2 further comprising:

raising the temperature of the slurry under pressure at the inlet until the temperature of the slurry during flow between the stones is above the boiling point of the slurry under standard atmospheric pressure;

maintaining said desired pressure on the slurry such that said slurry remains liquid during flow between the stones;

said slurry boiling off after the slurry is emitted from between the stones, thereby separating said slurry into vapor and substantially dry ground rubber particles.

7. The method of claim 1 wherein the step of establishing a flow rat e comprises:

setting the stones in a non-rotating position a spaced distance apart;

providing a fluid under a feed pressure to the inlet of said stone such that the fluid flows between the stones;

increasing the fed pressure of fluid to the inlet of the stones until a maximum flow rate is obtained, establishing thereby a set point feed pressure;

rotating the stones;

clamping the stones together such that a desired pressure between the stones not greater than said set point feed pressure is achieved.

8. The method of claim 7 further comprising:

raising the temperature of the slurry under pressure at the inlet until the temperature of the slurry during flow between the stones is above the boiling point of the slurry under standard atmospheric pressure;

decreasing the distance between said stones to establish a grinding pressure on the slurry such that said slurry remains liquid during flow between the stones;

said slurry boiling off after the slurry is emitted from between the stones, the slurry being separated thereby into vapor and substantially dry ground rubber particles.

9. The process of claim 8, the step of mechanically clamping further comprising:

said stones being clamped and held for mutual rotation in fixed, spaced juxtaposition equal to said second spaced distance.

* * * * *